United States Patent
Godsey et al.

(10) Patent No.: US 9,972,038 B2
(45) Date of Patent: May 15, 2018

(54) SHOPPING ASSISTANT WITH ACCOUNT BALANCE LIMIT DISPLAY

(71) Applicant: PayPal, Inc., San Jose, CA (US)

(72) Inventors: Sandra Lynn Godsey, San Jose, CA (US); Steven Romero, Portland, OR (US)

(73) Assignee: PayPal, Inc., San Jose, CA (US)

( * ) Notice: Subject to any disclaimer, the term of this patent is extended or adjusted under 35 U.S.C. 154(b) by 187 days.

(21) Appl. No.: 14/060,089

(22) Filed: Oct. 22, 2013

(65) Prior Publication Data

US 2015/0112836 A1    Apr. 23, 2015

(51) Int. Cl.
*G06Q 30/00* (2012.01)
*G06Q 30/06* (2012.01)

(52) U.S. Cl.
CPC ..... *G06Q 30/0613* (2013.01); *G06Q 30/0625* (2013.01); *G06Q 30/0641* (2013.01)

(58) Field of Classification Search
CPC .... G06Q 30/06–30/0645; G06Q 30/08; G06Q 50/01
See application file for complete search history.

(56) References Cited

U.S. PATENT DOCUMENTS

| | | | | |
|---|---|---|---|---|
| 7,848,943 | B2* | 12/2010 | Koide et al. | 705/7.25 |
| 2012/0123833 | A1* | 5/2012 | Nicolaidis et al. | 705/14.11 |
| 2012/0123834 | A1* | 5/2012 | Nicolaidis et al. | 705/14.11 |
| 2013/0282542 | A1* | 10/2013 | White | 705/35 |
| 2014/0081859 | A1* | 3/2014 | Nuzzi | G06Q 20/4037 705/44 |

OTHER PUBLICATIONS

"AutoLoans.com Releases Vehicle Financing App for iPhone and iPad Devices: Consumers searching for the best vehicle financing rates can use the brand new Car Calc iPhone and iPad app from AutoLoans.com now available in the iTunes store," PR Newswire, San Diego, Apr. 25, 2012.*

* cited by examiner

*Primary Examiner* — Adam Levine
(74) *Attorney, Agent, or Firm* — Maschoff Brennan

(57) ABSTRACT

Systems and methods of assisting in an electronic shopping experience are disclosed. A request may be received, from a user on a device having a user interface, to search for an item listed for sale in a marketplace. A balance amount of an account associated with or available to the user at the marketplace is displayed in the user interface. The search results are limited to at least one item having a sales price less than the displayed balance amount and the at least one item is displayed in the user interface. The account may be a user account at a payment service provider.

19 Claims, 6 Drawing Sheets ated by way of example and not limitation in the figures of
SHOPPING ASSISTANT WITH ACCOUNT BALANCE LIMIT DISPLAY

TECHNICAL FIELD

The present application relates generally to the technical field of electronic shopping, and, in various embodiments, to systems and methods of assisting in an electronic shopping experience.

BACKGROUND

Electronic commerce (e-commerce) sites are configured to offer for sale one or more items and provide virtual shopping carts to facilitate purchase of such items. A user visiting an e-commerce site, or online marketplace, can place one or more items of interest into a virtual shopping cart, and proceed to a checkout process once he or she is ready to purchase the item(s) placed in the cart. Once the user has completed the checkout process, the e-commerce site processes the purchase order to obtain payment and ship the purchased items to the user or hold the purchased items for pick up.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
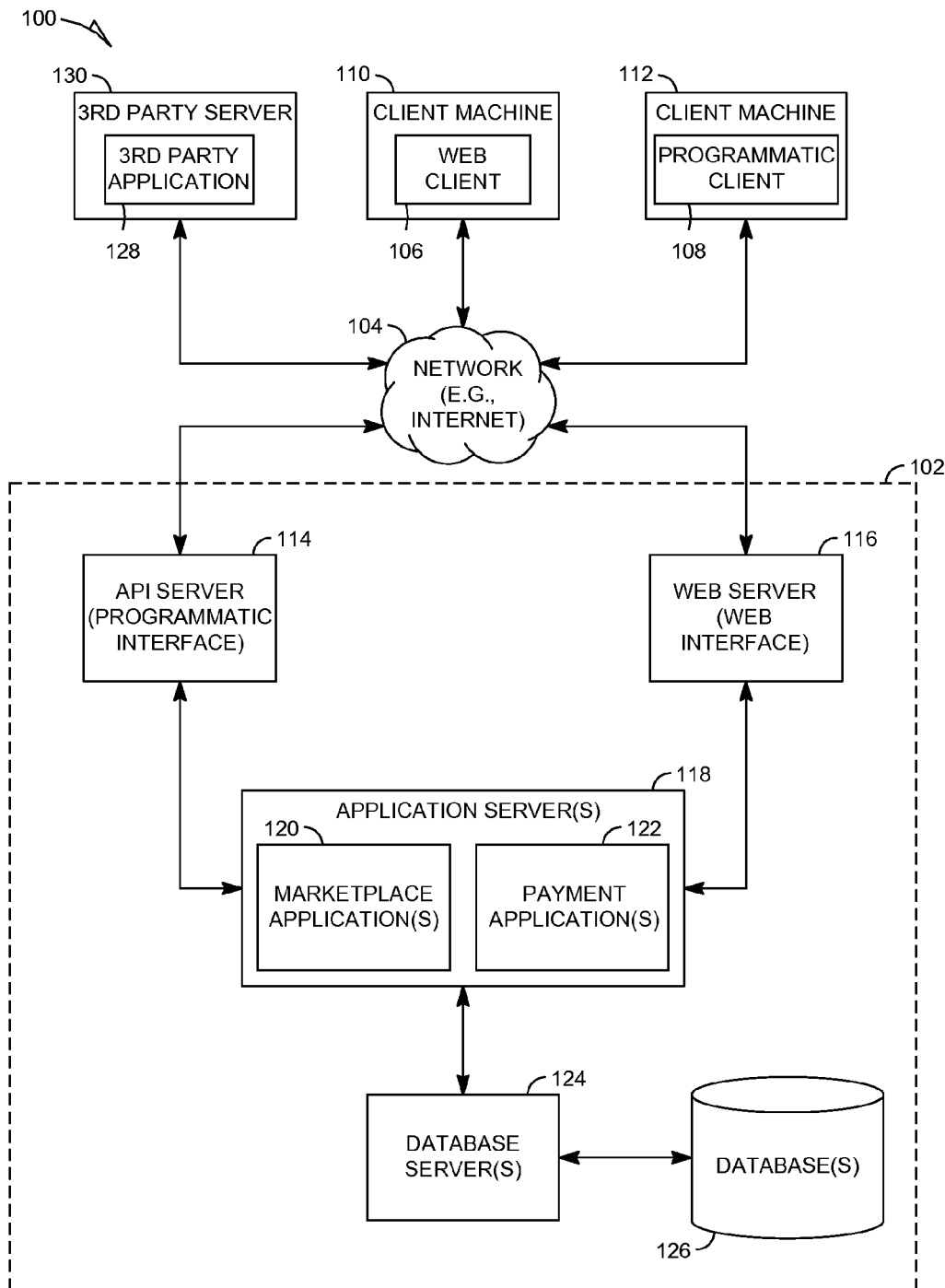
FIG. 1 illustrates a network diagram depicting an example system for providing a shopping assistant, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In some embodiments, a shopping assistant feature is conveniently provided that allows a user to see a balance amount of a user account concurrently when shopping for items online. In some examples, an available account balance is continuously visible in a user interface as the user conducts searches or views items on sale at a range of e-commerce sites. In other examples, an account balance is only displayed when searching the contents of a specific site.

The displayed balance may pertain to funds, points, or coupons (or the like) available to a user at one or more e-commerce sites, or in other examples may be associated with the user at a payment service provider (e.g., PayPal). It will be appreciated that the balances of other accounts (major banks) or retailer (on or offline) payment incentives are possible. In some examples, a mobile application executing on a user device presents an account balance while the user is browsing e-commerce sites using the device. The user is relieved of the inconvenience of visiting other pages or launch other applications to view this information and can browse and search for items for sale with this information readily visible in the same user interface. The account balance may be updated as new purchases are made, or in some examples may be revised to provide a hypothetical running balance in the event potential purchases identified by the user are in fact made.

In some examples, the displayed account balance includes, at least in part, the value of items previously sold by the user at an e-commerce site (e.g. eBay). The value derived from identified prior sales can be used to "fund" new purchases. This historic prior sales value is conveniently presented to a user who can tailor a purchasing budget accordingly. In some specific examples, an e-commerce site like eBay.com or amazon.com can present a PayPal account balance to a user while shopping. The user is able to spend PayPal money. The user is immediately and concurrently presented with account balance information and is aware in real-time of what funds (or other sources of value e.g. coupons, points, rewards and the like) are available for purchases. In some examples, accounts such as eBay and PayPal accounts are conveniently linked and the user is thereby encouraged to use the displayed PayPal balance as opposed to other sources of payment.

In some examples, a shopping assistant feature includes a selection tool (e.g., a mouse or track pad) to select an item identifier (e.g., an image of the item) from a native shopping site, drag it into a payment service provider (e.g., PayPal) shopping window, and drop the item identifier in the window, constituting a selection for later purchase. Once the item is in the payment service provider window, the feature may prompt the user to select additional details including size of the item and how the payment service provider should organize the item (e.g., shoes, kitchen supplies). The user can later review categorized items on the payment service provider shopping window or on the payment service provider website and select which items to purchase.

In some embodiments, a shopping assistant feature is provided that tracks which items a user "drops" into the payment service provider shopping widow, which items the user buys from the shopping window, and which items the user deletes from the shopping window without purchasing. If a user chooses to delete an item without purchasing it, the feature may prompt the user to select why he or she does not wish to purchase the item (e.g., too expensive). The shopping assistant feature may then automatically select a replacement item based on this rejection criteria provided by the user. For example, if an item was too expensive, the shopping assistant feature may replace the item with a less expensive alternative. The shopping assistant feature may also ask the user to rate, or provide other feedback for, items previously purchased from the payment service provider window. Using this data, the shopping assistant feature may develop a commerce profile about the user's shopping preferences. Merchants can then crowd-source this information to determine ratings and demand for items.

In some embodiments, a method may comprise receiving, from a user on a device, a request to add a first item to a virtual shopping cart. The first item in the virtual shopping cart may be caused to be displayed to the user on the device. A request to remove the first item from the virtual shopping cart may be received from the user on the device. The user may be prompted to indicate a reason for the request to remove the first item from the virtual shopping cart. An indication of the reason for the request to remove the first item from the virtual shopping cart may be received from the user on the device. A replacement item for the first item may be determined based on the indication of the reason for the request to remove the first item. The replacement item may be caused to be displayed to the user on the device.

In some embodiments, the reason for the request to remove the first item from the virtual shopping cart may be that the first item is too expensive, and the replacement item may be less expensive than the first item.

In some embodiments, the request to add the first item to the virtual shopping cart may be received via a first website on which the first item is offered for sale, and the method may further comprise receiving a request, from the user, to add a second item to the virtual shopping cart via a second website on which the second item is offered for sale prior to receiving the request to remove the first item from the virtual shopping cart, and causing the second item to be displayed in the virtual shopping cart concurrently with the first item to the user prior to receiving the request to remove the first item from the virtual shopping cart.

In some embodiments, the method may further comprise enabling the user to request to add the first item to the virtual shopping cart by dragging a visual identification of the first item into an area representing the virtual shopping cart. Causing the first item in the virtual shopping cart to be displayed to the user on the device may comprise causing the first item to be displayed in the area representing the virtual shopping cart. In some embodiments, the visual identification of the first item may comprise an image of the first item. In some embodiments, the area representing the virtual shopping cart may comprise a window. In some embodiments, the method may further comprise receiving a request to assign the first item to a first category via the area representing the virtual shopping cart, assigning the first item to the first category, and displaying items assigned to the first category in response to a request to display items of the first category.

In some embodiments, the method may further comprise managing a commerce profile of the user. The commerce profile may comprise information regarding shopping preferences of the user. In some embodiments, the method may further comprise updating the commerce profile of the user based on indication of the reason for the request to remove the first item. In some embodiments, the method may further comprise updating the commerce profile of the user based on feedback received from the user regarding an item previously purchased by the user.

In some embodiments, the method may further comprise determining at least one detail of the first item based on the commerce profile of the user subsequent to the first item being added to the virtual shopping cart. In some embodiments, the at least one detail of the first item may comprise at least one of a size of the first item and a color of the first item.

In some embodiments, a method may comprise receiving a request, from a user on a device having a user interface, to search for an item listed for sale in a marketplace. The marketplace may be an e-commerce site, or may be a retail store, warehouse, or garage sale, for example. Other on-line or real-world marketplaces are possible. The method may include causing a display, in the user interface, of a balance amount of an account associated with or available to the user at the marketplace and limiting the search results to at least one item having a sales price less than the displayed balance amount. The method may include causing the at least one item to be displayed in the user interface for potential purchase.

In some examples, the method may further comprise receiving a request from the user to enter a check out process and receiving a request from the user to initiate purchase of the at least one item using funds in the associated account.

In some examples, the method may further comprise displaying a revised balance amount in the user interface after the at least one item has been purchased. In some examples, the balance of a payment service provider account, such as a PayPal account balance, will be revised to account for the funds identified or withdrawn by the user to pay for the at least one item selected for purchase. A new "available balance" may be displayed accordingly. In some examples, a revised balance amount may be displayed based on a potential, prospective purchase of the at least one item for sale, or after the at least one item for sale has been purchased.

In some examples, the method may further comprise limiting the search results to a plurality of listed items having a combined sales price less than the displayed balance amount. In some examples, the displayed balance amount includes, at least in part, the value of at least one item previously sold by the user in the marketplace.

In some embodiments, a system may comprise a machine and a shopping assistant module. The machine may have a memory and at least one processor. The shopping assistant module may be configured to perform the operations, functions, and method steps discussed within the present disclosure.

In some embodiments, a non-transitory machine-readable storage device may store a set of instructions that, when executed by at least one processor, causes the at least one processor to perform the operations, functions, and method steps discussed within the present disclosure.

FIG. 1 illustrates a network diagram depicting an example publication system 100 for facilitating checkout of item(s) in a virtual shopping cart provided by an electronic commerce (e-commerce) environment according to some embodiments. The e-commerce environment may include items listed for sale at a brick-and-mortar retailer, or an on-line retailer, or an auction site, for example. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on client machines 110 and 112. In one embodiment, the publication system 100 comprises a marketplace system. In another embodiment, the publication system 100 comprises other types of systems such as, but not limited to, a social networking system, a matching system, an electronic commerce (e-commerce) system, and the like.

Each of the client machines 110, 112 comprises a computing device that includes at least a display and communication capabilities with the network 104 to access the networked system 102. The client machines 110, 112 comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the client machines 110, 112, the given one of the client machines 110, 112 may use its web browser to access the e-commerce site (or a variant thereof) hosted on the networked system 102. Although two client machines 110, 112 are shown in FIG. 1, more or less than two client machines can be included in the publication system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of e-commerce functions and services to users that access networked system 102. E-commerce functions/services may include a number of publisher functions and services (e.g., search, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the client machines 110 and/or 112.

Further, while the system 100 shown in FIG. 1 employs a client-server architecture, embodiments of the present disclosure are not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
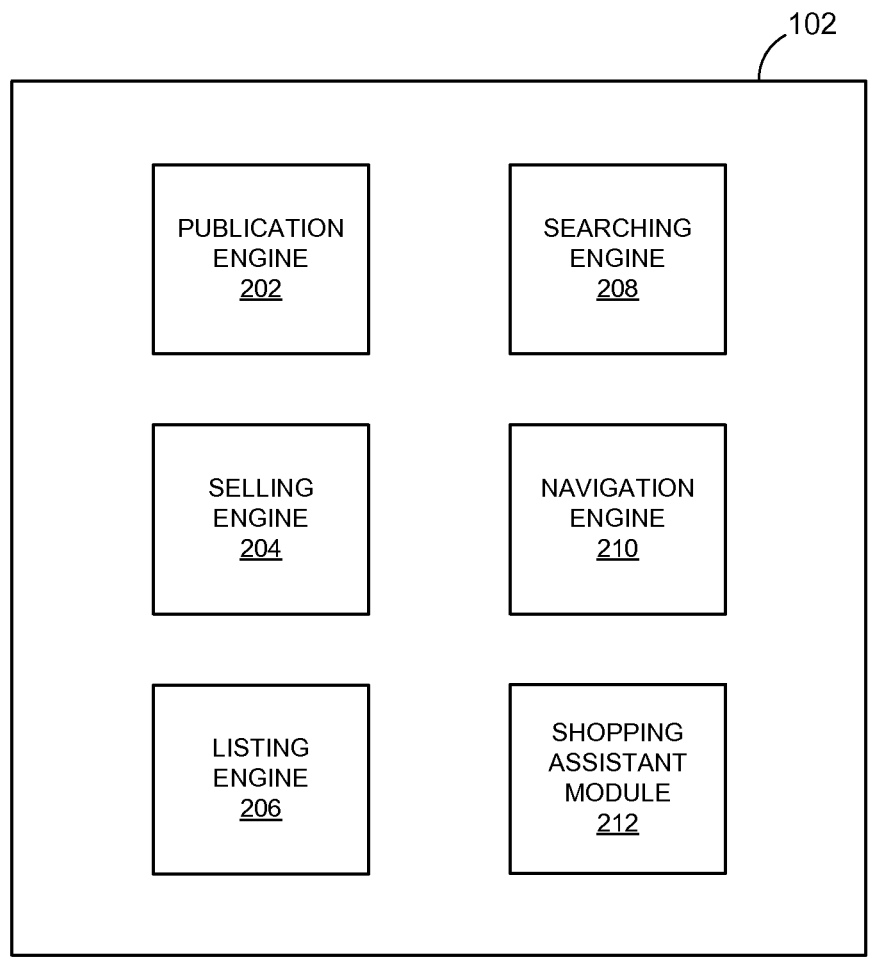
FIG. 2 illustrates a block diagram of additional details of the example system of FIG. 1, in accordance with some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., client machine 110, 112) of the user. The searching engine 208 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify as part of the search query a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

In some embodiments, a shopping assistant module 212 may be configured to prompt a user to indicate a reason (e.g., too expensive) for removing an item from a virtual shopping cart, and then determine and provide to the user a replacement item based on the reason for removing the item. The shopping assistant module 212 may also be configured to enable a user to request to add an item to a virtual shopping cart by dragging a visual identification of the item into an area representing the virtual shopping cart. The shopping assistant module 212 may further be configured to assign items in a virtual shopping cart to different categories. The shopping assistant module 212 may also be configured to manage a commerce profile comprising information regarding shopping preferences of the user, update the commerce profile of the user based on feedback from the user, and determine one or more details of an item placed in a virtual shopping cart based on the commerce profile of the user.

In some examples, the shopping assistant module 212 is configured to receive a request, from a user on a device having a user interface, to search for an item listed for sale in a marketplace and (possibly in conjunction with other modules) cause the display, in the user interface, of a balance amount of an account associated with or available to the user at the marketplace. The shopping assistant module 212 may be configured to limit the search results to at least one item having a sales price less than the displayed balance amount and cause the at least one item to be displayed in the user interface.

In some examples, the shopping assistant module 212 may be further configured to receive a request from the user to enter a check-out process and receive a request from the user to initiate purchase of the at least one item using funds in the associated account. In some examples, the shopping assistant module 212 is further configured to display a revised balance amount in the user interface after the at least one item has been purchased. The associated account may be a user account at a payment service provider.

In some examples, the shopping assistant module 212 is further configured to limit the search results to a plurality of listed items having a combined sales price less than the displayed balance amount. In some examples, the displayed balance amount may include, at least in part, the value of at least one item previously sold by the user in the marketplace.

It is contemplated that the shopping assistant module 212 may be further configured to provide or perform any of the other features, functions, or operations disclosed below. Additional modules and engines associated with the networked system 102 are described below in further detail. It should be appreciated that modules or engines may embody various aspects of the details described below.

Figure 3:
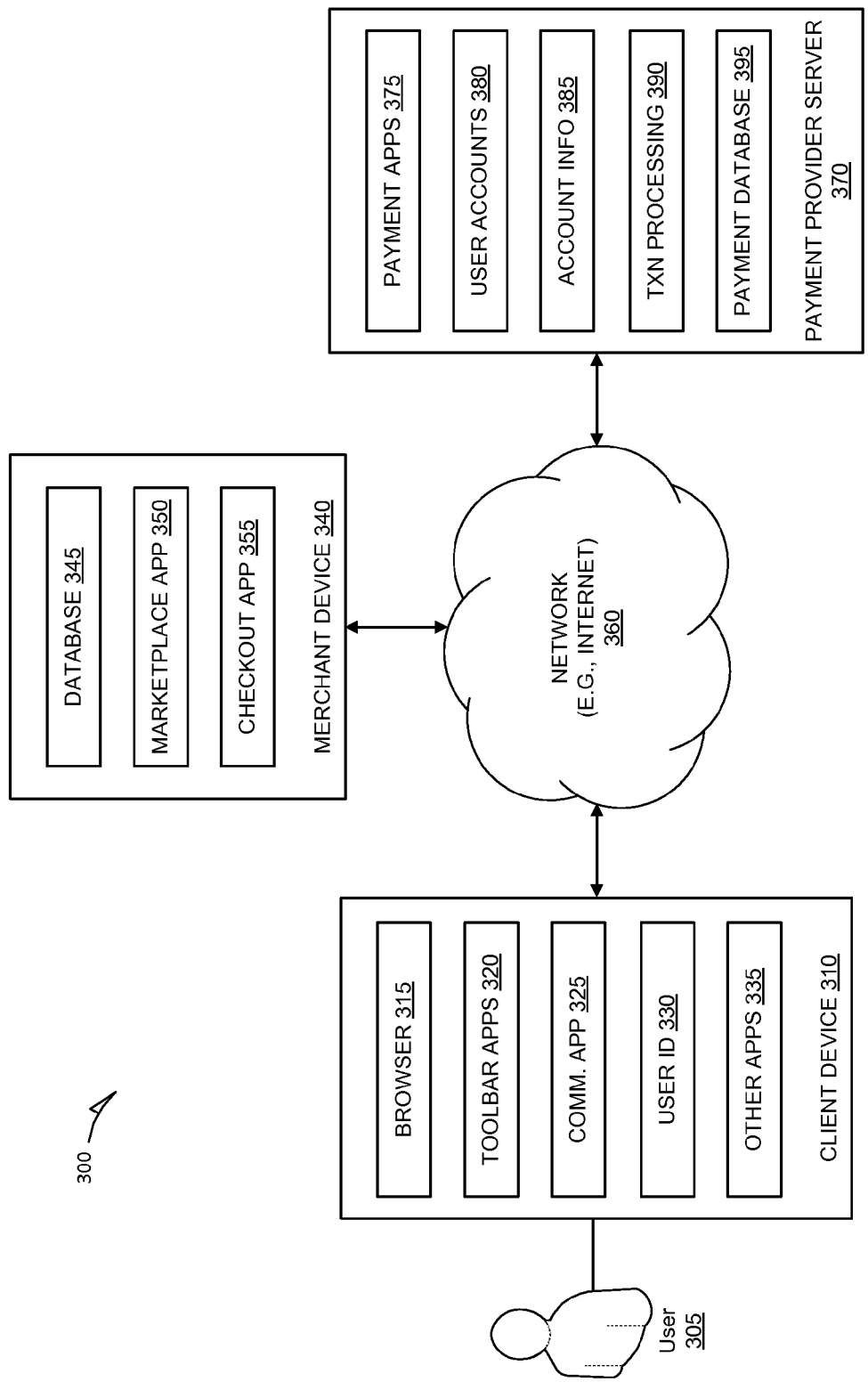
FIG. 3 illustrates a network diagram depicting an example system for providing a shopping assistant, in accordance with some embodiments.

FIG. 3 is a block diagram of a networked system 300 configured to handle processes, such as described herein, in accordance with some embodiments. System 300 includes a client device 310, a merchant device (e.g., server) 340, and a payment provider server 370 in communication over a network 360. Payment provider server 370 may be maintained by a service or payment provider, such as Pay Pal, Inc. or eBay, Inc. of San Jose, Calif. A user 305, such as a consumer, may utilize client device 310 to make a purchase transaction facilitated by payment provider server 370, with one or more merchants.

Client device 310, merchant device 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

Client device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

Client device 310 may include one or more browser applications 315 which may be used, for example, to provide a convenient interface to permit user 305 to browse information available over network 360. For example, in one embodiment, browser application 315 may be implemented as a web browser configured to view information available over the Internet or access a website of the payment provider. Client device 310 may also include one or more toolbar applications 320 which may be used, for example, to provide client-side processing for performing desired tasks in response to operations selected by user 305. In some embodiments, toolbar application 320 may display a user interface in connection with browser application 315.

Client device 310 may further include other applications 335 as may be desired in particular embodiments to provide desired features to client device 310. For example, other applications 335 may include security applications for implementing client-side security features, programmatic client applications for interfacing with appropriate application programming interfaces (APIs) over network 360, or other types of applications. Applications 335 may also include email, texting, voice and IM applications that allow user 305 to send and receive emails, calls, texts, and other notifications through network 360. Client device 310 may include one or more user identifiers 330 which may be implemented, for example, as operating system registry entries, cookies associated with browser application 315, identifiers associated with hardware of client device 310, or other appropriate identifiers, such as used for payment/user/device authentication or identification. In some embodiments, user identifier 330 may be used by a payment service provider to associate user 305 with a particular account maintained by the payment provider. A communications application 325, with associated interfaces, enables client device 310 to communicate within system 300.

Merchant device 340 may be maintained, for example, by a merchant or seller offering various items, products and/or services through an online site or app. Generally, merchant device 340 may be maintained by anyone or any entity that receives money, which includes charities as well as retailers and restaurants. Merchant device 340 may include a database 345 identifying available products and/or services (e.g., collectively referred to as items), which may be made available for viewing and purchase by user 305. Merchant device 340 may also include a marketplace application 350 which may be configured to serve information over network 360 to browser application 315 of client device 310 and/or payment provider server 370. In one embodiment, user 305 may interact with marketplace application 350 to view various items available for purchase from the merchant.

Merchant device 340 may also include a checkout application 355 which may be configured to facilitate the purchase by user 305 of goods or services identified by marketplace application 350. Checkout application 355 may be configured to accept payment information from or on behalf of user 305 through payment provider server 370 over network 360. For example, checkout application 355 may receive and process a payment confirmation from payment provider server 370, as well as transmit transaction information to the payment provider and receive information from the payment provider (e.g., a transaction ID). Checkout application 355 may also be configured to accept one or more different funding sources for payment.

Payment provider server 370 may be maintained, for example, by an online service provider which may provide payment between user 305 and the operator of merchant device 340. In this regard, payment provider server 370 includes one or more payment applications 375 which may be configured to interact with client device 310 and merchant device 340 over network 360 to facilitate the purchase of goods or services by user 305 of client device 310 as well as search merchant offerings and prices as discussed above.

Payment provider server 370 may also maintain a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Account information 385 may also include information associated with the payment process described herein. Beneficially, payment application 375 may be configured to interact with merchant device 340 on behalf of user 305 during a transaction with checkout application 355 to handle payments.

A transaction processing application 390, which may be part of payment application 375 or separate, may be configured to receive information from a client device 310 and/or merchant device 340 for processing and storage in a payment database 395 as described above. Transaction processing application 390 may include one or more applications to process information from user 305 and/or the merchant for processing a transaction from client device 310 as described herein. As such, transaction processing application 390 may store details of a transaction or from an email and associate the details accordingly for individual users. Payment application 375 may be further configured to determine the existence of and to manage accounts for user 305, as well as create new accounts if needed, such as the set-up, management, and the provision of various services as described herein.

Figure 4:
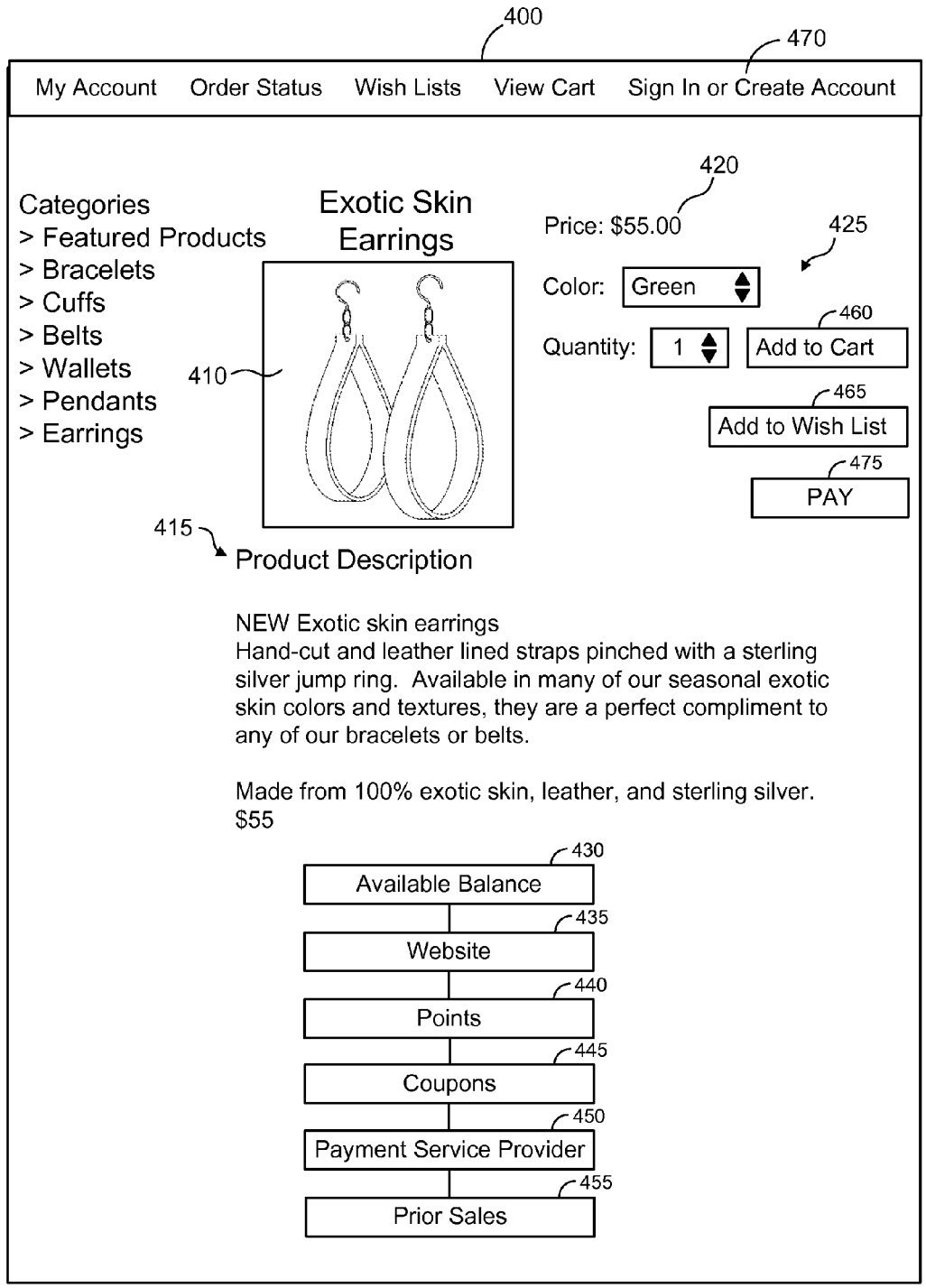
FIG. 4 illustrates a graphical user interface displaying stages of using a shopping assistant in an online shopping experience, in accordance with some embodiments.

FIG. 4 illustrates a graphical user interface 400 displaying stages of using a shopping assistant in an online shopping experience, in accordance with some embodiments. In FIG. 4, the graphical user interface 400 displays an item page showing an item being offered for sale on an e-commerce website. Information related to the item for sale may be displayed on the item page. Such information may include, but is not limited to, one or more item identifiers 410 (e.g., an image of the item, a name/title of the image), a description 415 of the item, and a price 420 of the item. The graphical user interface 400 may also display one or more selectable details 425 of the item. Such selectable details 425 may include, but are not limited to, color of the item, quantity of the item, and size of the item. A variety of user interface elements may be employed to enable the user to make selections regarding the selectable details 425. Such user interface elements include, but are not limited to, drop-down menus and radio buttons. Another user interface element may include a displayed balance amount 430 of an account associated with or available to the user to facilitate payment of items for sale in a marketplace, such as the e-commerce site visible in FIG. 4. The balance amount 430 may include aspects such as a website credit, incentive or funds 435 associated with the e-commerce site. The balance amount 430 may include information about points 440, coupons 445, a payment service provider account 450, or the value of prior sales 455 made by the user at a specific time or during an identified time range, for example. A revised balance amount 430 may be displayed based on a potential, prospective purchase of the item for sale, or after the item has been purchased. Other user interface elements are also within the scope of the present disclosure.

In some embodiments, the user may be requested at element 470 to provide authentication information (e.g., a username and password) in order to use the features of the shopping assistant. In further embodiments, as part of a check out process, the user may view selected items placed in a virtual shopping cart or wish list using elements 460 or 465. The items in the virtual shopping cart may be presented to the user in a shopping assistant window or on its own page, such as the page of a payment service provider (e.g., PayPal) that provides a shopping assistant window. When viewing the items in the shopping cart, the user may decide that an item should be removed from the cart. In some embodiments, upon the user requesting or commanding that an item be removed from the shopping cart, he or she may be prompted to provide a reason for the removal, such as the item is too expensive. This information regarding why the user is removing the item from the shopping cart may then be used to determine a replacement item to replace the item that is being removed. The user may pay for an item (or items) placed in the virtual shopping cart using payment element 475. A revised balance may be displayed as available balance amount 430 accordingly. In some examples, the user interface 400 of the shopping assistant may include elements to help a user quickly understand whether an available balance might cover a variety of purchases, or items placed in a virtual shopping cart, for example. A revised balance amount 430 may be displayed based on a selection of items placed in the cart, for example. Items in the cart may be selected or de-selected for potential purchase accordingly until the available balance is sufficient to meet the total purchase amount. In some examples, a user may be prompted to select which aspects of an account balance (e.g., elements 435 to 455) should be used to fund a purchase of an item offered for sale in the e-commerce site.

Figure 5:
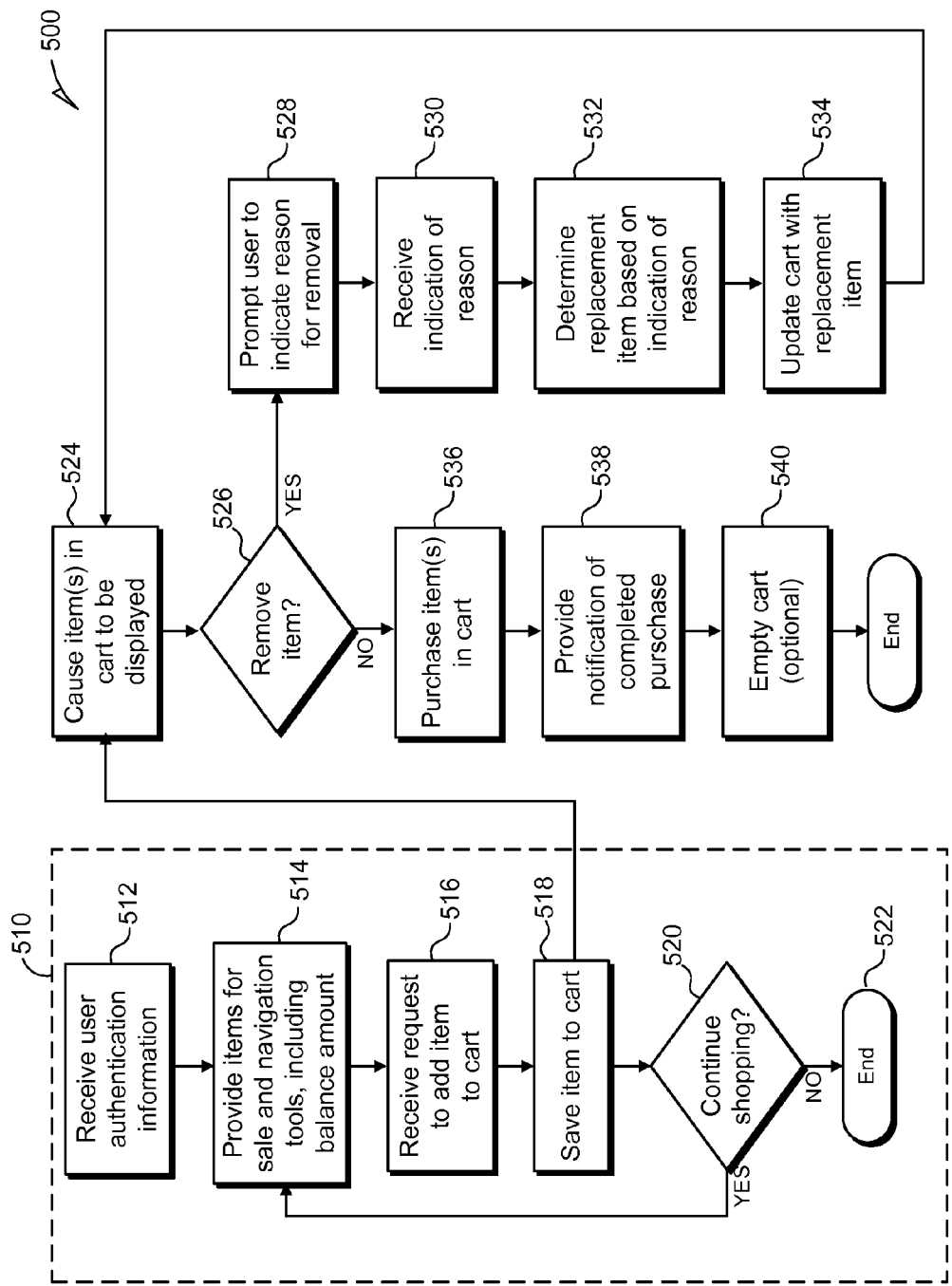
FIG. 5 is a flowchart illustrating a method incorporating use of a shopping assistant, in accordance with some embodiments.

FIG. 5 is a flowchart illustrating a method 500 in accordance with some embodiments. The operations of the method 500 may be performed by the client machine 110, client machine 112, and/or a server included in the networked system 102 (e.g., API server 114, web server 116, or application servers 118). The operations may be performed by modules (e.g., shopping assistant module 212). The various operations of the method 500 may be performed in different order and the method 500 may include only some of the operations described below.

At operation 512, authentication information may be received from a user. Authentication information can comprise a user name and a password associated with the user. The user provided information can be checked by a server included in the networked system 102 to verify the user information.

Once the user's identity has been verified, at operation 514, one or more pages (or e-commerce site(s) or online marketplace) offering for sale products and services (collectively referred to as items) may be provided on the client machine 110 or 112. Information associated with items offered for sale (e.g., price, detailed description, photos, expiration time, seller identity, etc.), and navigation tools to navigate among the item offerings and to add, delete, or update item(s) to a shopping cart for online purchase may be provided. The information may include a balance amount 430 as described further above. In some embodiments, the items may be offered for sale at fixed prices (at least up to an expiration time specified for respective items), and the items may be offered for sale by one or more sellers. The user navigates among the items offered for sale until he/she finds an item he/she is desirous of purchasing, which may be based on the information relating to the balance amount 430.

At operation 516, a user request or command to add a particular item to his/her shopping cart may be received. At operation 518, the item may be saved to the user's shopping cart. At operation 520, the user has the option to continue shopping or end the current shopping session. If the user indicates a desire to continue shopping, then UI screens associated with items available for purchase may be provided again at operation 514. Otherwise, if the user indicates that he/she has completed shopping or there is no activity from the user for a certain period of time, the current shopping session may be ended at operation 522.

It is contemplated that the user authentication operation at 512 can occur any time prior to or simultaneous with the saving operation at 518. Operations 512-522 (collectively referred to as the adding item(s) to a cart operation 510) may be performed in the same or different session from operations 524-540. The user may add or update item(s) in the cart in one or more sessions. One or more of operations 512-522 can also occur simultaneously with one or more of operations 524-540. These and other variations in the performance of the method 500 are within the scope of embodiments of the present disclosure.

At operation 524, the item(s) in the user's shopping cart may be caused to be displayed to the user. Upon inspection of the shopping cart, the user may decide to remove an item or to proceed to checkout. At operation 526, it is determined whether or not the user wants to remove an item from the shopping cart.

If the user has specified that he or she wants an item removed from the shopping cart, then, at operation 528, the user is prompted to indicate a reason for removing the item. Such reasons may include, but are not limited to, the item being too expensive, the item being the too big or too small, the location of the item being too far away, and the estimated delivery time of the item being too long.

At operation 530, an indication of the reason for removal of the item from the shopping cart may be received from the user. This indication may be provided using any of a variety of user interface elements, including, but not limited to, drop-down menus.

At operation 532, a replacement item may be determined based on the indicated reason for removal provided by the user. For example, if the user indicates that the reason for removal of an item is that the item is too expensive, a replacement item may be found that is less expensive, yet comparable in other respects.

In some embodiments, in order for an item in the user's cart to be substituted with another item, the cart item should be a new item and uniquely (and definitively) identifiable by the networked system 102. The networked system 102 can maintain a database or catalog of uniquely identified items, wherein detailed information about each item in the catalog may include information such as photos, dimensions, specification, manufacturer, model number, and other information about the item. Such a catalog can comprise thousands or millions of uniquely identified items. The catalog can be compiled by crawling the web to extract item information. For each item submitted for sale to the networked system 102, the networked system 102 may attempt to uniquely identify that item using the existing catalog of uniquely identified items (e.g., the item submitted for sale is catalog item #20,567). For example, if a seller submits product information comprising a new black iPad2 WiFi model with 16 GB of memory, this item can be uniquely identified using the catalog. The networked system 102 may definitively know what this item is. On the other hand, if a seller submits product information comprising a used black iPad2 WiFi model with 16 GB of memory, even if it is reported as being in excellent condition, the networked system 102 cannot uniquely identify this item because the networked system 102 cannot verify the condition of the item.

In some embodiments, for each item in the user's cart that has been uniquely identified and selected for removal, the shopping assistant module 212 may search for at least one equivalent item that is available for sale by the networked system 102 and which addresses the reason for removal provided by the user. An equivalent item may thus be an item that is also new and uniquely identified as being the same catalog item as the item in the user's cart (e.g., substantially identical in color, size, accessories, amount of memory, model number, specification, etc.). In order to determine whether an equivalent item is a better deal than the item in the user's cart, the total price of the equivalent item and cart item may be compared. The total price of an item may include the item price, shipping and handling cost, sales, tax, discounts, and all other costs, fees, and promotions associated with purchase of the item. For example, if a first seller offers a certain discount for purchasing more than one item in the same order, this may be taken into account if the potential replacement item is being offered by a different (second) seller so that the user's cart will no longer include multiple items from the first seller with the substitution.

In some embodiments, one or more existing sellers of equivalent items may be solicited to offer their items at better overall prices than item(s) in the user's cart. The solicitation may also include requesting potential sellers to offer equivalent item(s) at a better deal than item(s) in the user's cart. The results of these solicitations may then be used as replacement items for items selected for removal.

At operation 534, the user's shopping cart may be updated by replacing the item selected for removal with the determined replacement item(s). The method 500 may then return to operation 524, where the item(s) in the user's chopping cart are displayed, this time with the replacement item in the place of the item selected for removal.

At operation 526, if it is determined that no items have been selected for removal from the shopping cart, then, at operation 536, the user may purchase the item(s) that are in the shopping cart. At operation 538, a notification may be provided to the user that the purchase has been completed. At operation 540, the purchased items may then be removed from the user's shopping cart.

Additional Details and Features

In some embodiments, a service is provided to a user or consumer that enables an enhanced online shopping experience. In various embodiments, the user may select an item of interest, save it for a specific occasion/category, and share all saved items in the category to a closed group or open group of other users. The user may share a list of one or more items, along with quantity desired, so that others may see and purchase items for the user.

The user may see a "best" price for the item across the Internet and not just from a single merchant or single site. The user may also see a list of "best" prices from different merchants and locations so that the user can select what is "best" or most desirable for the user, including if and where the item is available for local pick up. The system may determine user preferences, such as sizes, colors, and other item features, from previous purchases, so that when items are returned, they include "desired" or previously purchased user features.

A list of saved items of interest may be shown on a single page from different online merchants. The list or display of items may show items that have been placed in a cart to be purchased, have already been purchased, or are still waiting for possible purchase. The user may drag and drop or otherwise place individual items on the display in a single cart on a user display. The single cart may show all selected items with the site or merchant that is offering the item. Once ready for purchase, the user may see a pre-populated screen of a shipping address, shipping option, and funding source, which the user can edit if desired.

With an item or list that is shared from another, the user may select a desired item from the list for purchase. The user may then see a pre-populated screen showing the recipient name and shipping address (such as of the person who shared the list with the user).

The user may also be sent notifications, such as through text, when the item is available at or below a certain user-specified price.

In some embodiments, a user may express interest in an item. The system can search for best deals for that item across the web, including any coupons that can be applied. Deals may be color-coded to help visualize best deals. The user can also indicate that a particular item is too expensive, but wants to see less expensive similar items, look-alikes, and/or knock-offs, and the system will return such a list to the user.

The following is a list of some features of the shopping assistant of the present disclosure, according to some embodiments:

- Ability to create a virtual scout that will "hunt" for deals (e.g., best prices).
- Ability to create a virtual scout that will hunt for "similar but cheaper items."
- Ability to set a maximum price and endpoint date for a virtual scout (of a specific item).
- Ability to receive email or text alerts when a deal is found by a virtual scout.
- Ability to share deals/coupons/offers with friends and family (e.g., via social media).
- Ability to drag and drop items from merchant site(s) into a universal shopping/wish list.
- Ability to add an item to a universal shopping/wish list by scanning a tag in a store or taking a photo.
- List of the item (potentially leveraging Milo/Red Laser technology).
- Ability to invite friends and family to view/purchase items on public wish lists.
- Ability to invite friends and family to contribute to a public wish list.
- Ability to send "thank you" notes for items purchased off wish list.
- Ability to share a specific item with friends and family via email (item dispatch).
- Ability to share "public" wish list(s) with select merchants in exchange for personalized coupons/offers on wish list items.
- Ability to review and compare all found instances of the item—with the current prices and discount amounts.
- Ability to see instances of the specified item as listed on an e-commerce website.
- Ability to identify "preferred" merchants/stores on an item digest.
- Items from "preferred" merchants may be displayed on the digest whether or not their prices were in the 'best' deal range.
- Ability to see if an item is available for local pick up.
- Ability to drag and drop an item from a shopping/wish list view to universal buy bag (with ability to see running total, estimated shipping, etc.).
- Ability to pay for items—from multiple merchants—in a single transaction.
- Ability to view local donation drop off locations.
- Ability to donate an item similar to the one purchased item via printed pre-paid label (if applicable).
- Ability to sell like item on e-commerce website with option to donate proceeds to pre-selected charity.
- Ability to track purchases/receipts across all merchants (in one central place).
- Ability to track packages from multiple merchants (in one central place w/dynamic updates).
- Ability to share items recently purchased via social media.
- Ability to build "trophy case" of favorite items or items recently purchased and sync with Pinterest (includes ability to view trophy items posted by users with similar shopping preferences/profiles).

In one embodiment, a user may view a merchant shopping site, such as through a PC, smart phone, computing tablet, or other suitable device. The user can select a shopping assistant service offered by a service provider, such as Pay Pal, Inc. of San Jose, Calif. The service may be offered through a plug-in or other means. Once selected, the user may login through a pop-up screen on the merchant site, such as by providing a user identifier (e.g., an email address) and a password or PIN. Once logged in or authenticated, the user can drag and drop an item from the merchant site onto an area of a pop-up or overlay screen. The screen can be moved if it is covering a desired item. The screen also enables the user to select a link to see previous items selected by the user or from a user list.

Once an item is dragged and dropped onto the shopping assistant screen, various types of information may be provided to the user related to the item, such as price and size, where the size can be obtained from information about prior user purchases or user supplied information. The screen may also contain a drop-down menu to save the item in a desired location.

The location may be a list of other items acquired through the shopping assistant from one or more merchants. The list may show each item with a visual image, brief description, price, and merchant name, with an area where the user can drag and drop a desired item to purchase. Multiple lists may be available to the user, such as based on a topic, subject, or category. Items may also indicate whether a sale is currently being offered for an item. Item details may include links to add the item to a cart, email the item to a contact, "liking" the item, and/or viewing prices for the item.

More detailed information about an item may be available to the user and can include different details for the item, including price and merchant. One or more links or buttons may enable the user to be alerted with any price reductions or other information about the item or see similar items. The shopping assistant window or screen may provide the user with a button indicating "like" or "favorite", which the user can select to convey to the merchant that the user likes the item dragged and dropped onto the shopping assistant window. This information may be used by the merchant, along with possibly information provided by the service provider, to enable the merchant to suggest recommendations or deals to the user. For example, the user may have different pages or lists, one or more of which may be dedicated to a specific merchant. On that page would only be offerings from the particular merchant, and the offerings may include recommendations or details from the merchant to the user. Note that the area to drag and drop items for purchase may be present across different lists, such that a common cart can be used to make purchases from different merchants.

Items on a list can include a "like" button, a "dislike" button, and a "too expensive" button the user can select to convey that information to the merchant. For example, a suggested item from a merchant may be "disliked" so that the merchant does not present similar items to the user in the future or at least for the near future. Liking an item may enable the merchant to present similar items, and a user indication of "too expensive" may result in the merchant presenting items or similar items that are less costly. Disliking an item may delete the item from the list or give the user an option of deleting the item.

Items on a user list may also display an indication that the user has a loyalty card, coupon, or other incentive associated with the merchant or item. Details of the incentive may be provided with the item. Items in which there is an associated incentive and which are placed in the shopping cart for checkout may automatically show the incentive with the item. The user can select to use the incentive from the cart or checkout process. The shopping cart may show a default funding source for the user (e.g., selected by the user or a payment provider), which the user can change as desired. The user may also have the option of using multiple payment sources for one or more items, e.g., paying for one item with multiple funding sources and/or paying for the total with multiple funding sources.

A liked item or other designated item may be searched to show the user similar or identical items from one or more merchants. The results may be shown in order of best total price (including shipping and any other costs) or other format. A found item may allow the user to select a button that will cause the system to search for similar items and return the results to the user.

The user may also have a page for coupons and offers from different merchants. In one embodiment, this page may show the merchant and the specific offer, coupon, or incentive. The service provider may collect coupons it deems relevant to the user based on user transaction history and other indicators. Collected coupons may be "clipped" by the user to be placed for use in the user account or "trashed" or deleted so that it does not show up any more on the page. This also helps the service provider iteratively adjust what coupons to present to the user in the future.

The shopping assistant may also present items of interest in the user's desired size(s). The size information may be obtained from measurements or information provided by the user, purchases made by the user, or other information. In one embodiment, the user is shown articles of clothing and the size of the clothing purchased by the user, along with a link or button the user can select to indicate whether the purchased size was just right, too small, or too big. This information can then be used by the service provider to adjust sizes for similar items presented to the user. Because different manufacturers may have slightly different sizes, a user may be presented with a suitable size based on the manufacturer, instead of a "one-size-for-all" approach. For example, merchant A may offer a dress that would be medium size for the user, but merchant B may offer a similar dress that would be a large size for the user.

The service provider may also provide information to merchants to help them provide more useful offers or recommendations to users and increase the likelihood of a sale. Information such as how long a user looks at an item, whether that item is purchased or held (and for how long), the price paid or looked at, items shared, liked, disliked, added, deleted, too expensive, etc., may be compiled and presented to the merchant in easy to digest formats to allow the merchant to make changes to offerings, generally or specific to a user. Information may be merchant specific, item specific, category specific, or any other suitable breakdown.

The service provider may also provide information when multiple users are looking at a specific merchant item or offering, a specific item from different merchants, and/or similar items from one or more merchants. The price viewed for the item is also noted. Based on the price point the user is looking at or prices the user has paid for or previously looked at for the item or similar item, the merchant can use information to send an offer to users currently interested in the item or a similar item from the merchant or different merchants. This allows the merchant an opportunity to make multiple sales quickly on an item by pricing it to an acceptable level to users.

Commerce Profile Intelligence Through Payment Service Provider (e.g., PayPal) Identity In some embodiments, the shopping assistant module 212 may use custom algorithms that predict users' aesthetics and preferences based on information gleaned from informatics mining across merchant or service provider data and as facilitated by user log in.

An identity provider (IDP) product may utilize OpenID and OAuth protocols to authenticate a user with a merchant website. In one example, once a consumer uses PayPal Access to engage with the shopping assistant, a shopping assistant-specific profile, known as the commerce profile, may be created as part of the user data set. This information may be seeded from interpretations of the data that already exists in the user's merchant or service provider data set.

Inputs to the algorithms may include, but are not limited to, the following information, across merchant service providers and payment service providers (e.g., PayPal, eBay, and RedLaser data stores):

Payment Service (e.g., PayPal) Account Information: e.g., E-mail Address(es), Shipping Address(es), Telephone Number(s), Account ID, Account Password, Bank Account(s), Debit and Credit Card(s), Gifts and Discounts, Payment Service Account Balance, Payment Service Account Type Account of Payment Service Account Creation, Registered Mobile Device, Security Key, Payment Service Access First Usage, Payment Service Preferred Site/Website, Preferred Language, Time Zone, Coupon in Wallet Merchant, Coupon in Wallet Details, Coupon in Wallet Date Clipped/Added, Payment Service Coupon Merchant, Payment Service Coupon Details, Payment Service Linked Account PPID, and Payment Service Linked Account E-mail Address.

Historical Transaction Information (e.g., with PayPal, eBay): e.g., Transaction Date, Transaction Type, Payment To, Status, Amount, Business Name, E-mail, Shopping Cart Contents Quantity, Shopping Cart Contents Item, Shopping Cart Contents Options, Shopping Cart Contents Price, Sales Tax, Shipping, Handling, Fee Amount, Invoice ID, Shipping Address, Business Contact URL, Business Contact E-mail, Funding Type, Funding Source, Unique Transaction ID, and Checkout Type.

E-commerce Service Provider (e.g., eBay) Account Information: e.g., ID, Password, Watched Item Name, Watched Item Description, Watched Item URL, Watched Item Price, Bidding Item Name, Bidding Item Description, Bidding Item URL, Bidding Item Price, Bidding Item Shipping, Wish List Item Name, Wish List Item Description, Wish List Item URL, Wish List Item Price, Wish List Item Shipping, Didn't Win Item Name, Didn't Win Item Description, Didn't Win Item URL, Didn't Win Item Price, Didn't Win Item Shipping, Selling Item Name, Selling Item Description, Selling Item URL, Selling Item Price, Selling Item Shipping, Saved Seller Name, Saved Seller Link, Saved Seller Category, Saved Search Name, Saved Search Type/Category, Feedback Score, Feedback Positive Percentage, Member ID Effective Date, Fashion App Download, Fashion App Usage, Fashion App Purchase, Fashion App Purchase Name, Fashion App Purchase Description, Fashion App Purchase URL, Fashion App Purchase Price, and Fashion App Purchase Shipping.

RedLaser Usage Information: e.g., Total Scans Lifetime, Scan Date(s), Total Searches Lifetime, Search Date(s), Scan to Purchase, Scan to Purchase Item, Scan to Purchase Item Description, Scan to Purchase Item Merchant, Scan to Purchase Item Price, and Scan to Purchase Item Shipping.

The individual algorithms that are run against the aforementioned data may include:

Algorithm: Preferred Item Category
Input: All aforestated attributes
Output: Ordered list of categories, each with an affinity score (see Algorithm: Affinity Score), includes the following sub-distinctions:
  Algorithm: Preferred Item
  Input: All aforestated attributes
  Output: Ordered list of items, as part of categories, each with an affinity score
  Algorithm: Color Frequency
  Input: All aforestated attributes
  Output: Non-ordered list of colors, in association with Preferred Item, each with an affinity score
  Algorithm: Affinity Score
  Input: All aforestated attributes
  Output: Numeric value, beginning at 1 and with no defined maximum; a value of 0 represents the base score for an item that may have been recommended or matched to the user, but that has no user value associated with it, until there is positive user action associated with the item itself.
Algorithm: Size or Distinctive Specification
Input: All aforestated attributes
Output: Non-ordered list of item type and size or distinctive paired values; depending on the category and item type, specification that distinguishes an item and an affinity in the future. For example, if the category is Women's Clothing, and the item type is Skirts, the distinctive specification would be size (such as Sm, 4, etc). However, if the category is Motorcycles, the distinctive specification might be Ducati.
Algorithm: Photographic Interpretive Scan
Input: Any photograph that is part of the input from the aforementioned attributes
Output: Numeric value, beginning at 0, with each number mapping to an interpretive persona that represents the user's taste affinity. For example:
0 No specification
1 Traditional
2 Classic
3 Modern
4 UltraModern
Algorithm: Interest Profile
Input: Preferred Item Category, Preferred Item, Color Frequency, Affinity Score, Size or Distinctive Specification, Photographic Interpretive Scan
Output: Ordered list of Preferred Item details, both actual and predictive, representing the user's affinity and preference for certain types of items and items themselves. An affinity score across a broad set of categories will determine the hierarchy of placement for a specific type of category and will inform the big data analytic package output as well as recommendations that will be requested of merchants who receive the big data.

Merchant to Individual Profile Package Output:
The output of the interest profile, on a per user basis, will be exported in a way that the merchant who accepts profile data can consume and match to data in their product catalog to make offers, present coupons, and make recommendations to the user, once the user has elected to make a connection to the merchant (e.g., via a voluntary favorite indicator that invites the merchant to create a catalog specifically for the user).

Big Data Analytic Package Output:
The output of the interest profile, on a per user basis, will be collected as a whole across the user base and packaged to the merchant as anonymous data. The merchant can interpret this data in a way that impacts their internal purchasing, offerings of sales or specials, availability of coupons or deals, or target marketing to specific or general populations.

Independent Buyable Object Detection

The shopping assistant module 212 may employ means to detect buyable items on a page using DOM-walking intelligence. When a user calls the Shopping Assistant via the installed browser extension, intelligence associated with the shopping assistant may detect and highlight the buyable items on the website the user is currently shopping on by reading the document object model (DOM) on the native website.

With the information gleaned from the native website, relevant information may be matched from the commerce profile and pulled into the browser extension, when applicable and relevant. For example, if the user is looking for an item with a detectable size, the size from the commerce profile is pulled in unless the user has designated a specific size on the native website (meaning the size selected on the native website overrides any size that is stored on the commerce profile and would be suggested if no size was otherwise indicated or selected).

Cross-Web Collection and Maintenance

Additional features of the present disclosure may include custom agents that maintain the health and viability of links collected by a user through an independent browser extension. There may be three primary search agents that represent this core functionality:
  Recurring Check on Original Link
  Multiple Instances of Original Object
  Like Item Recommendation
Recurring Check on Original Link When a user acquires an item via the shopping assistant browser extension, the link to that item is stored within an eBay Inc. database and is maintained as viable by regular and recurring checks that determine whether the original link is still valid. The agent specifically queries the host URL with the specific information that was originally captured, and either validates or returns updated information on the following attributes. The link can either be deemed valid or invalid. When the link is invalid, a relevant message is displayed to the user, e.g., "No longer available at [merchant name/URL]". When the link is determined as valid, any update to the core captured information will be reflected appropriately to the user. This includes the following core attributes:

Without Merchant Integration: The following elements can be determined without integration with the merchant, through agents that scrape the information from the host web page.
Date of Capture
Name
Description
Current Price
Original Found Price (If Different)
URL/Domain
Retail Price (Average of Found Prices or Known MSRP/Retail Price)
Image
Algorithm: Ranking of Price and Differential (Reflecting Deal) Input: Original Found Price, Retail Price or MSRP, Current Price Output: Descending ordered list of URL/Domain and current price pair, with savings calculated against the savings from one entry to another. (For example, if the item was originally found for $10.00, and there are 4 other instances of the item found (see Multiple Instances of Original Object) for the prices of $3.00, $5.00, $6.00 and $9.00, and the original MSRP is $10.00, the output would be: URL: $3.00 (Save $7.00); URL: $5.00 (Save $5.00); URL: $6.00 (Save $4.00); URL: $9.00 (Save $1.00); URL: $10.00 (Found Price), (MSRP).)
[UPC Code, Retail/Merchant Number, Item Number, and/or QR Code] This information may or may not be shown to the user, depending on whether it is stored as part of the description. Where this information exists on the merchant site, however, it will be scraped and acquired by the shopping assistant and used to contribute to the Confidence Score.
With Merchant Integration: The following elements can additionally be determined with optional merchant integration. This information is passed from the merchant through the Shopping Assistant AP! that connects the merchant to the Shopping Assistant and eBay Inc. datastore.
Size (Availability)
Sale (If the item is currently designated as being on sale)
Offer (If there is currently a special offer available for the consumer)
Coupon Available: If a coupon is available for use on the item or on the website, whether or not a loyalty card is associated with the user account.
Loyalty Points Available: If loyalty points can be earned and applied to the user's account, when a loyalty card has been added from the user's PayPal wallet.

Multiple Instances of Original Object

Once the original object is known, an agent is launched to find other instances of the object at related or other merchants. The object can be directly queried by integrated merchants or indirectly queried via non-integrated merchants.

The process by which multiple instances are found begins by running a custom algorithm against the original item information in order to extract, or deconstruct, the original link and find common information that can be used to construct a search query.

Deconstruct Original Link to Construct Search Logic

Once an item has been acquired by the shopping assistant, a custom algorithm runs against the information stored and is used to extract common information that will then be used to construct new search logic as well as contribute to the input of the Confidence Score.

Algorithm: Extract Search Logic/Construct Search Logic
Input: Name, Description, URL/Domain, UPC Code, Retail/Merchant Number, Item Number, QR Code.
Output: Conditional Expression (For example, if the input is:
Name: Alexander McQueen Dress
Description: McQ Alexander McQueen Psychedelic Print Cap Sleeve Mini Dress in neon pink Be the talk of the town with the dress of the summer. McQ Alexander McQueen presents this bold acid print silk round neck mini dress with navy blue caped sleeves. The multi-colored neon palette will be sure to get you noticed. The fully lined dress fastens with a concealed zip on the reverse.
URL/Domain www.neimanmarcus.com
UPC Code 123456789
The output would be:
Alexander McQueen AND McQ AND 123456789 AND Psychedelic Print Cap Sleeve Mini Dress AND Neon Pink AND OR acid print silk AND OR round neck AND OR mini AND OR navy blue capped sleeves AND OR concealed zip AND NOT neimanmarcus.com
Run Search and Assign Confidence Score Once the conditional expression is extracted from the original input and a conditional expression is ready, the expression is used to search for multiple instances and, depending on the confidence score, the results are ranked and presented (or not) to the user.

Algorithm: Multiple Instances Result/Confidence Score
Input: Original Item Conditional Expression; Results Match.
Output: Confidence Score as numeric value, beginning at 0 representing no confidence and ending at 100 representing exact match. An exact match means that all attributes of the conditional expression were matched and/or there was a direct confirmation from an integrated merchant feed, and/or there was the presence of a unique product code and the unique product code was matched.

Depending on the relevance of the match, the object is assigned a confidence score, which determines the level of confidence we have that the item is an exact match. For example, if the original conditional expression is:
Alexander McQueen AND McQ AND 123456789 AND Psychedelic Print Cap Sleeve Mini Dress AND Neon Pink AND OR acid print silk AND OR round neck AND OR mini AND OR navy blue capped sleeves AND OR concealed zip AND NOT neimanmarcus.com
And the Results Match is:
Alexander McQueen AND McQ AND 123456789 AND Psychedelic Print Cap Sleeve Mini Dress AND Neon Pink AND OR acid print silk AND OR round neck AND OR mini AND OR navy blue capped sleeves AND OR concealed zip
The confidence score would be 100 because two verifying factors were present: a matched UPC code and an all-attributes match.

Customer to Merchant Relationship Compatibility, Profile Sharing, and Intelligence Building Based on usage monitoring and informatics-driven algorithms, we present a suggestion for a customer to form a relationship with a PayPal merchant, facilitate the relationship through exposing the merchant to select user data that drives recommendations, provide a feed through which the merchant is able to manifest recommendations directly to the user, and pass the merchant specific informatics that allow the merchant to build their own intelligence about the user as a customer.

There are three primary algorithms that determine whether or not the consumer has an established relationship with the merchant, and what the affinity for that specific merchant is:

Individual Merchant Affinity Score
Behavior-Based Affinity Match
Weighted Value Affinity Score This information is initially stored as part of the Commerce Profile. The consumer, at any point of engagement with a merchant website, has the opportunity to "favorite" a merchant, and this act indicates a preference for the merchant to the extent that information about the consumer is shared with the merchant. The merchant then takes this information, analyzes it, and directly applies it to feed recommendations back to the consumer. In other words, the act of favoriting a merchant serves as an invitation, from the consumer to the merchant, to present items, recommendations, deals, and/or offers that the merchant believes would be desirable to the consumer. At the time the consumer favorites the merchant, the output of the algorithms are passed to the merchant for consumption, along with a package of information representing the consumer's Commerce Profile.

Algorithm: Individual Merchant Affinity Score
  Input: Attributes of the Commerce Profile
  Output: Merchant Affinity Score for the requesting merchant as a numeric value, beginning at 0 representing no established relationship and with no maximum value.

Algorithm: Community Affinity Score
  Input: Date and time that an individual consumer with a relevant merchant affinity score made a connection to the merchant via favoriting, date and time a consumer viewed recommendations made by the merchant that was favorite, date and time that a purchase was made from a merchant recommendation.
  Output: A numeric value, beginning at 0 and with no maximum, representing the total number of users who indicate a preference for a merchant based on a scan and storage of the described in put data (each event listed above contributes 1 to the score).

Algorithm: Weighted Value Affinity Score
  Input: All available Individual Merchant Affinity Scores
  Output: Ordered list with weighted value where the scores available for the individual customer are weighted against one another and patterns that are detected within the body of the scores add to the value of the individual weights and rank the affinity score appropriately, so there is a logical scale and preference relative only to the individual's preferences and behavior (in order to accurately interpret the affinity scores and recommendations based on them).

Affinity Presence, Count: The total number of Shopping Assistant users in the community at large, who are otherwise not connected to the merchant, who have a merchant affinity score associated with the merchant (based on the Commerce Profile information).

Affinity Ranking, Average: For the total number of users identified in the Affinity Presence, Count, the average of the affinity score across that user base.

Affinity Score and Profile Data: The specific affinity score of the merchant, for an identified user (meaning one that has favorited the merchant). In addition, a package of user-specific Commerce Profile data, including but not limited to:
  URLs to Merchant Items Stored
  UPCs of Merchant Items Stored
  Interest Profile
  Size or Distinctive Specifications
  Preferred Item Category (including Preferred Item, Color Frequency, and Affinity Score)
  Lifetime Value Score
  PayPal Usage Frequency
  Average Amount Spent
  Purchase History (Last Month)
  Purchase History (This Time, Last Year)
  Coupons Used, Last 6 Months
  Coupons in Wallet
  Loyalty Card Holder
  Loyalty Card Number
  Item-Specific Feedback Signals The user experience, from the consumer side, includes the act of favoriting and then viewing and using the recommendations delivered back by the merchant.

In-Context Digital Wallet Platform

For anything added to the user's PayPal Digital Wallet, the Shopping Assistant provides a direct, in-context platform to surface elements of the digital wallet that can be exploited, utilized, or applied. Elements of the digital wallet that can be surfaced through the Shopping Assistant may include but are not limited to: Store Loyalty Cards or Loyalty Card Programs and Reward Points Application and Tracking, Store Coupons or General Offers, and PayPal Funding Sources.

Store Loyalty Cards or Loyalty Card Programs and Reward Points Application and Tracking When the user has previously attached a loyalty card to the PayPal Digital Wallet, relevant reward points and loyalty card offers are shown as applicable to items that are found and presented via the Shopping Assistant. For example: As a Consumer, I am a member of DSW Shoe Warehouse Reward Your Style program. As part of managing my PayPal Digital Wallet, I have scanned the barcode associated with my keychain representing my loyalty card, and therefore the loyalty card is now stored as part of my PayPal Digital Wallet. Through use of the Shopping Assistant, I drag a pair of shoes into the browser extension to track them, and the deal scout finds that the pair of shoes I'm looking for is available at DSW, where I am a loyalty card holder. Because DSW is a merchant integrated with PayPal and the Shopping Assistant, the merchant receives a signal (see Merchant Signals: Identified) that includes information about the consumer, and that they're a loyalty card holder. As a result, DSW is able to return information back through the shopping assistant regarding points or loyalty card programs that are applicable, thereby authorizing PayPal to act on behalf of those offers if a purchase is made.

Store Coupons or General Offers

When a merchant is integrated with PayPal via the Shopping Assistant, PayPal passes specific information to the merchant regarding items that are being sought by individuals and collectively across the Shopping Assistant user base (see Item-Specific Feedback Signals). Based on this information, the merchant may choose to incent the customer to make a purchase on a specific item, or to move inventory, by presenting a coupon or general offer to the user. This is manifested to the user via the Shopping Assistant, and is visible on individual items that appear in the user's Shopping Assistant storefront. In addition, when a loyalty card has related coupons available for application on purchase of a given item, coupons or offers of this type are presented to the customer via the individual item on the user's Shopping Assistant storefront.

PayPal Funding Sources

When a customer moves to purchase an item they have previously collected via the Shopping Assistant, the funding sources that are present in the user's PayPal wallet are available for use and selection, seamlessly, at the time of universal checkout. The user can elect to use an existing funding source, can split the payment across multiple funding sources, and can add a new funding source (which would then be saved back to the user's PayPal account). Any purchase made through the Shopping Assistant will be reflected within the PayPal account on PayPal.com as a standard PayPal transaction.

Deal Scout Using Combined Technologies and Specialized Agents; Algorithms

The shopping assistant deal scout will make use of Google Search API for Shopping and Bing Search API and will run custom algorithms against the combined results returned from those existing technologies to determine the truest and most accurate ranking of available results on sought goods. Once a user collects an item via the PayPal Shopping Assistant, the item's originating URL is captured as part of the scraped data. At that time, the URL, along with other pertinent metadata, is analyzed and stored as part of the Shopping Assistant database. On the backend, specific information is scraped and inferred out of the source data, and that information is used to launch relevant searches. This is accomplished through the deal scout valid link algorithm.

Algorithm: Deal Scout Valid Links and Groupings

Input: Links returned from Google Search API for Shopping and Bing Search API and output from the Search Agents described below.

Output: Ordered list of links, categorized in groups representing identical (meaning the item has been verified as a match to the sought item) like (meaning the item is verified as like the item sought [for example, the same item in a different color], or unknown (the exact classification is not determined at the point of analysis).

Search Agents

Using the output of the Deal Scout Valid Link algorithm, three search agents are used to test the validity, in general, of the links and also to confirm buy-ability as well as detect the exact nature of the grouping, when output from the Deal Scout Valid Links and Groupings Algorithms is determined as unknown. These agents will work on all links as part of a classified group until there are no items in the unknown category for a given sought object.

Unknown Link Type Investigator

Any link that comes out of the Deal Scout Valid Links and Groupings Algorithms categorized as Unknown will be pinged and scraped so that further information can be determined about the link lead. The results of the scraping should determine whether an item can be reclassified as Identical or Like, and then the following agents will work on the links, as needed and applicable. In the event the link directs to a blog or aggregate tool, the link will be further researched via the Shopping Assistant agents that will further scrape the page on the blog or aggregate to determine whether or not additional or unknown buyable objects exist.

Link Validity Test

Any link that comes out of the Deal Scout Valid Links and Groupings Algorithms categorized as Identical or Like will be pinged and confirmed for validity on a recurring basis (of variable frequency) and the results presented to the user via the deal scout within the Shopping Assistant interface.

Buyable Item Confirmation

Any link that is confirmed as valid will be pinged and confirmed as buyable. If the merchant selling the item is integrated with PayPal, that confirmation will be done on the backend through direct API integration. If the merchant is not integrated with PayPal, a scraping mechanism will confirm the fact that the item can be bought in the relevant color, size, or other identified information provided via the Commerce Profile or otherwise indicated at the time the item was acquired on the Shopping Assistant. To illustrate this cycle, take the following example: As a user I am shopping on the McQ website and capture an item by dragging an image of the item into the shopping assistant.

Visibly, the Shopping Assistant captures specific information but also captures additional information and saves that information to the backend (see also CrossWeb Collection and Maintenance). This information is analyzed and used to construct a search, which is then fed through Google Search API for Shopping and Bing Search API, as appropriate. For example, the search might be constructed as:

Alexander McQueen AND McQ AND 305231 RY233 7261 AND Dragonfly Wing Leggings AND Printed lycra leggings AND OR 80% polyester AND OR 20% Elastine AND OR bleached neon brown AND NOT www.alexandermcqueen.com And returned results from Google might include:
http://www.alexandermcqueen.comlmcq/womenswear/leggings/Dragonfly-WingLeggings/805144055.en US.pd.html
http://www.polyvore.com/printed leggings/shop?query=printed+leggings
http://www.polyvore.com/mcq by alexander mcqueen/shop?brand=McQ+by+Alexander+McQueen Whereas returned results from Bing might include:
http://www.alexandermcqueen.com/mcq/womenswear/leggings/Dragonfly-WingLeggings/805144055.en US.pd.html
http://www.polyvore.com/printed leggings/shop?query=printed+leggings
http://www.polyvore.com/mcq by alexander mcqueen/shop?brand=McQ+by+Alexander+McQueen
http://www.selfridges.com/en/Womenswear/Dragonfly-wing-leggings 236-2000084-305231RY233/?previewAttribute=Powder First, the information is fed through the Shopping Assistant Deal Scout Valid Links and Groupings algorithm, which is used to eliminate duplicates and construct an ordered list of links in their known categories. In the above example, the final link analysis would determine that the exact item is available, across the web, in the following location:
http://www.alexandermcqueen.com/mcq/womenswear/leggings/Dragonfly-WingLeggings/805144055.en US.pd.html And that a like item (the same dragonfly print in a different color) is available in one confirmed location:
http://www.selfridges.com/en/Womenswear/Dragonfly-wing-leggings 236-2000084 305231RY233/?previewAttribute=Powder There are two links that fall into the Unknown category:
http://www.polyvore.com/printed leggings/shop?query=printed+leggings
http://www.polvvore.com/mcq by alexander mcqueen/shop?brand=McQ+by+Alexander+McQueen So the Unknown Link Type Investigator agent runs and pings the relevant URLs and scrapes the sites for the relevant information. Upon this action, it is discovered that
http://www.stylebop.com/productdetails.php?id=393251&campaign=affiliate.flinkshare/usa/&utm source=affiliate&utm medium=linkshare&utm campaign=adsus&siteID=Hy3bqNL2jtQ-zx28aCpZuk8pOIsQylotww is a valid link with a buyable item that falls into the Like category.

At this point, all of the links have now been categorized as Identical (1) or Like (2), and all of this information is presented to the user via the deal scout in the Shopping Assistant. The links are maintained for as long as the links remain valid.

In the event the user has determined to receive an alert about the specific price of an item, the system will notify the user when a price threshold is met. This information presents itself to the user, via the Shopping Assistant in several forms. On the collection page where the original item was captured, the lowest price version of the item is presented.

In addition, on the deal scout drill-down pages, the user can see all instances of the buyable item, and, when applicable, is given access to view like items (for example, when there is only one found item, the Shopping Assistant will present like items as part of the basic returned results).

Auto-Collection of Coupons and Offers

Based on the users' commerce profile and ongoing intelligence collected by the Shopping Assistant, custom search agents will proactively seek and store coupons and other offers on specified items, merchants, or brands. Relevant items will also automatically be added to the PayPal digital wallet.

Initial seeding of the coupons and offers content shown to a new user of the shopping assistant is based on intelligent interpretation of past purchase history across eBay properties and interpretation of the items that have been added to the user's shopping list. The gleaned information is matched to the coupons presently available form integrated merchants, as well as coupons that are gleaned from feed sources, like RetailMeNot.

Algorithm: Coupons and Offers

Input: Historical Transaction Information (eBay and PayPal), RedLaser Usage Information, and Collected Information (via Cross-Web Collection and Maintenance), Integrated Merchant Information and available coupons and offers, feed data from retail coupon sites, like RetailMeNot.

Output: Ordered list of coupon or offer references, with weighted ranking based on the predicted relevance.

My Right Size Database

Based on a measurements index and specialized database, size-specific information that is gleaned based on user data or specifically entered by a user will be run against the database and a suggested size will be recommended, if known.

At the time of merchant integration with the Shopping Assistant, the merchant delivers meta-information to PayPal, specific to the nature of the merchant's business and to be used for the purposes of enhancing the customer experience when interacting with the Shopping Assistant and when searching for items that may be or may be like items in the merchant's inventory.

Part of the information the merchant is asked to deliver in a feed relates to product-specific details that match profile elements collected for the user. In the case of merchants who specialize in clothing and attire, we would collect size information specific to the merchant. We then ask the customer to provide size information, either specific to items that fit them perfectly or to actually enter in measurements that would help us to match with merchant sizes.

As an example, say the merchant is the J. Crew; at the time of integration, we would get a data feed that included all size information relevant to all groups serviced, which would include Women, Men, and Children.

This information is fed into the database and, when coupled with Shopping Profile information, is used to feed the Right Size Recommendation algorithm.

When the customer interacts with the Shopping Assistant, they are able to complete what is called a Shopping Profile, which lists common information about the shopper based on the sought goods and based on the information we know about the shopper, having looked at their purchase and general eBay, Inc. history. As part of the shopping profile, we are also able to present information back to the user about past purchases and whether those purchases should be added to the shopping profile in order to make future recommendations.

When engaging with the Shopping Profile, the user has the ability to report back on the fit, quality, or satisfaction of the item so that the information can be used to match specific future items (in the case of clothing sizes) or to feed into the recommendations engine, when either searching for like or categories of items. Then, when an item is added to a user's list, PayPal logic will match items being sought by the user, recommend specifics associated with the merchant offerings (like a size), and will make the sought information available to integrated merchants for the benefit of proper stocking, extending an offer to the user, and beyond.

Algorithm: Right Size Match

Input: Merchant Size Information (fed directly from integrated merchants and scraped from popular merchants who are not integrated), Consumer Shopping Profile Information Output: Size Recommendation for sought item with a weighted value from 1 to 10 representing confidence Intent to Purchase Merchant Signal When a user has collected an item that resolves back to a PayPal-integrated merchant, PayPal will send a signal to the merchant indicating intent. As the user modifies their behavior in relevance to the item, that signal will be updated or a new signal will be sent. The signal may inform inventory alerts, coupons, offers, or other merchant-inspired actions. Signals might include looking at an item, length of time the time is stored, price point user is looking for, removal of an item, purchase of an item (for example, from another merchant).

The signal information is presented to the merchant in the form of a merchant dashboard, which presents general Shopping Assistant information as well as merchant-specific information.

For both the general population and specific merchants, the intent to purchase is shown as a total number of watched items.

Item-Specific Feedback Signals

For a PayPal integrated merchant who is connected to a user through a shopping assistant-facilitated relationship, signals can be sent to the merchant on specific items that are chosen by and presented to the consumer through the shopping assistant platform based on commerce profile intelligence. These discrete item-specific signals may include:

Watching
  Intend to Buy/Watch
 Trending
  Like
  Don't Like
  Too Expensive
  Sent to Friend
  Posted to Social/Social Channel
  Added to shopping bag
  Removed from shopping bag Bought
   Bought at [average price]
Crowd-Sourced Deal Origination, Merchant Signals, and Single-Channel Platform A signal may be sent to a merchant when multiple consumers are viewing a select item that resolves back to that Pay Pal-integrated merchant. The signal will be issued to inform the merchant regarding the total number of customers interested in the item, and what (if any) price threshold the crowd is driven by. This represents a reverse offer the crowd is able to make back to the merchant, where the merchant is able to respond to the crowd with an identical or similar offer. The Shopping Assistant provides a platform for the merchant to act on the crowd signals and make an offer to the crowd, which may or may not be predicated against a commit to purchase on the behalf of the crowd participants.

It is contemplated that any of the features and/or embodiments discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
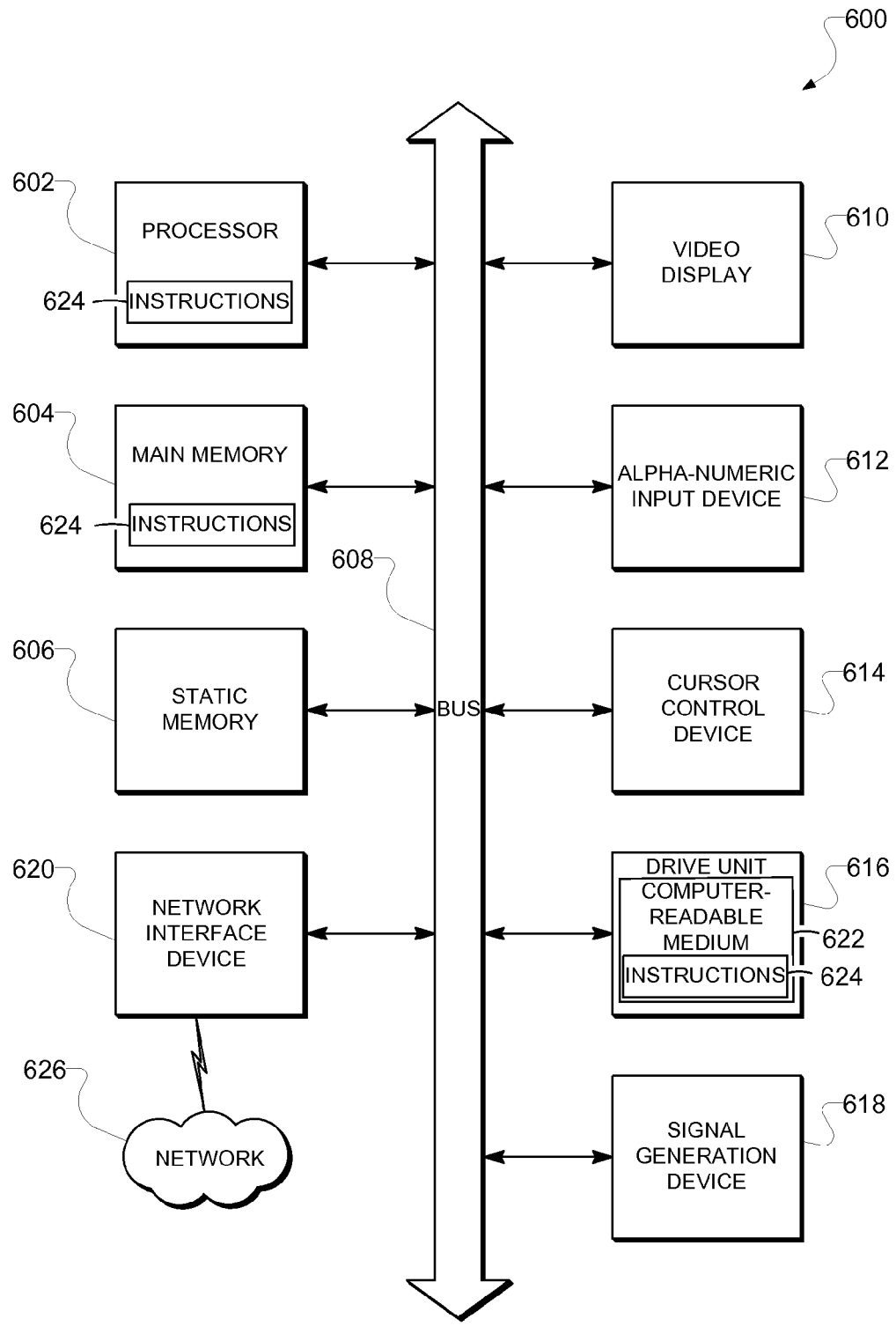
FIG. 6 shows a diagrammatic representation of a machine in the example form of a computer system within which a set of instructions may be executed to cause the machine to perform any one or more of the methodologies discussed herein, in accordance with some embodiments.

FIG. 6 is a block diagram of a machine in the example form of a computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for facilitating online transactions, the system comprising:
   a machine having a memory and at least one processor;
   a shopping assistant module, executable by the machine, to:
      maintain a database of items listed for sale on a publication network;
      receive one or more requests, during a browsing session from a user via a device having a user interface, to search for an item listed on the publication network;
      cause a display, in the user interface during the browsing session without interrupting the browsing session and without requiring a user input, of a balance amount of an account associated with or available to the user to acquire one or more items listed on the publication network;
      limit, based on the account balance, search results to at least one item having a price less than the displayed balance amount;
      cause the dynamic display, in the user interface, of a revised balance amount based on a potential acquisition of the at least one item;
      cause, in response to the price of the at least one item being less than the account balance, data representing the at least one item to be displayed in the user interface, the data including a visual identification representation of the at least one item on a merchant website that is displayed in the user interface; and
      configure the user interface to enable the user to add the at least one item to a virtual shopping cart that is independent of the merchant website by dragging the visual identification, as displayed with respect to the merchant website in the user interface, into an area in the user interface that represents the virtual shopping cart.

2. The system of claim 1, wherein the shopping assistant module is further to:
   receive a request from the user to enter a check-out process; and
   receive a request from the user to initiate purchase of the at least one item using funds in the associated account.

3. The system of claim 2, wherein the shopping assistant module is further to:
   display, in the user interface, a revised balance amount after the at least one item has been purchased.

4. The system of claim 1, wherein the account is a user account at a payment service provider.

5. The system of claim 1, wherein the shopping assistant module is further to:
   limit the search results to a plurality of listed items having a combined sales price less than the displayed balance amount.

6. The system of claim 1, wherein the displayed balance amount includes, at least in part, a value of at least one item previously sold by the user in the marketplace.

7. A method for facilitating online transactions, the method comprising:
   maintaining a database of items listed for sale on a publication network;
   receiving one or more requests, during a browsing session from a user via a device having a user interface, to search for an item listed in a marketplace on the publication network;
   causing a display, in the user interface during the browsing session without interrupting the browsing session and without requiring a user input, of a balance amount of an account associated with or available to the user at the marketplace to acquire one or more items listed on the publication network;
   limiting, based on the account balance, search results to at least one item having a price less than the displayed balance amount;
causing the dynamic display, in the user interface, of a revised balance amount based on a potential acquisition of the at least one item;
   causing, in response to the price of the at least one item being less than the account balance, data representing the at least one item to be displayed in the user interface, the data including a visual identification of the at least one item on a merchant website that is displayed in the user interface; and
   configuring the user interface to enable the user to add the at least one item to a virtual shopping cart that is independent of the merchant website by dragging the visual, as displayed with respect to the merchant website in the user interface, into an area in the user interface that represents the virtual shopping cart.

8. The method of claim 7, further comprising:
   receiving a request from the user to enter a check out process; and
   receiving a request from the user to initiate purchase of the at least one item using funds in the associated account.

9. The method of claim 8, further comprising displaying a revised balance amount in the user interface after the at least one item has been purchased.

10. The method of claim 7, wherein the account is a user account at a payment service provider.

11. The method of claim 7, further comprising:
    limiting the search results to a plurality of listed items having a combined sales price less than the displayed balance amount.

12. The method of claim 7, wherein the displayed balance amount includes, at least in part, a value of at least one item previously sold by the user in the marketplace.

13. A non-transitory machine-readable storage device storing a set of instructions that, in response to being executed by at least one processor, causes a system to perform a set of operations comprising:
 maintaining a database of items listed for sale on a publication network;
 receiving one or more requests, during a browsing session from a user via a device having a user interface, to search for an item listed in a marketplace on the publication network;
 causing a display, in the user interface during the browsing session without interrupting the browsing session and without requiring a user input, of a balance amount of an account associated with or available to the user at the marketplace to acquire one or more items listed on the publication network;
 limiting search results to at least one item having a price less than the displayed balance amount;
 causing the dynamic display, in the user interface, of a revised balance amount based on a potential acquisition of the at least one item;
 causing data representing the at least one item to be displayed in the user interface, the data including a visual identification of the at least one item on a merchant website; and
 configuring the user interface to enable the user to add the at least one item to a virtual shopping cart that is independent of the merchant website by dragging the visual, identification as displayed with respect to the merchant website in the user interface, into an area in the user interface that represents the virtual shopping cart.

14. The system of claim 1, wherein the virtual shopping cart is associated with a payment provider website.

15. The method of claim 7, wherein the virtual shopping cart is associated with a payment provider website.

16. The machine-readable storage device of claim 13, wherein the virtual shopping cart is associated with a payment provider website.

17. The system of claim 1, wherein the virtual shopping cart is associated with a mobile application of a payment provider that is executing on the device.

18. The method of claim 7, wherein the virtual shopping cart is associated with a mobile application of a payment provider that is executing on the device.

19. The machine-readable storage device of claim 13, wherein the virtual shopping cart is associated with a mobile application of a payment provider that is executing on the device.

* * * * *